United States Patent
Laight

(10) Patent No.: US 10,384,734 B2
(45) Date of Patent: Aug. 20, 2019

(54) VEHICLE STAND

(71) Applicant: Laight Designs Limited, Edgbaston, Birmingham (GB)

(72) Inventor: Simon Brian Laight, Birmingham (GB)

(73) Assignee: Laight Designs Limited, Edgbaston, Birmingham (GB)

( * ) Notice: Subject to any disclaimer, the term of this patent is extended or adjusted under 35 U.S.C. 154(b) by 0 days.

(21) Appl. No.: 15/882,185

(22) Filed: Jan. 29, 2018

(65) Prior Publication Data

US 2018/0215428 A1     Aug. 2, 2018

(30) Foreign Application Priority Data

Feb. 1, 2017 (GB) .................................. 1701618.9

(51) Int. Cl.
| | |
|---|---|
| *B62H 3/04* | (2006.01) |
| *B60R 5/04* | (2006.01) |
| *B60R 9/10* | (2006.01) |
| *B60R 11/00* | (2006.01) |
| *B62H 3/06* | (2006.01) |

(52) U.S. Cl.
CPC ................ *B62H 3/04* (2013.01); *B60R 5/04* (2013.01); *B60R 9/10* (2013.01); *B60R 2011/0036* (2013.01); *B62H 3/06* (2013.01)

(58) Field of Classification Search
CPC .... B62H 3/04; B62H 3/06; B60R 9/10; B60R 2011/0036; B60R 5/04
See application file for complete search history.

(56) References Cited

U.S. PATENT DOCUMENTS

| | | | |
|---|---|---|---|
| 557,470 A | 3/1896 | Young | |
| 586,741 A * | 7/1897 | La Barre et al. | ........ B62H 3/04 211/21 |
| 587,147 A | 7/1897 | Hein | |
| 587,856 A * | 8/1897 | Patton | ...................... B62H 3/04 211/21 |

(Continued)

FOREIGN PATENT DOCUMENTS

| | | |
|---|---|---|
| AU | 198061552 A1 | 2/1982 |
| AU | 53176/90 B | 10/1990 |

(Continued)

OTHER PUBLICATIONS

UKIPO Search Report dated Jun. 29, 2017 for Corresponding GB Application No. GB1701618.9.

(Continued)

*Primary Examiner* — Ko H Chan
(74) *Attorney, Agent, or Firm* — Polsinelli PC

(57) ABSTRACT

A stand for locating a wheeled vehicle such as a bicycle has front and rear locating structures for receiving a wheel and having three pairs of cooperating locating surfaces for locating the wheel. The front locating structure has a front upper pair and a front lower pair cooperating locating surfaces, and the rear locating structure has a rear lower pair cooperating locating surfaces. The two lower pairs are positioned asymmetrically relative to the upper pair. The front locating structure has an opening positioned between its upper and lower pairs of cooperating locating surfaces wide enough to allow the wheel axle to pass through the front locating structure.

20 Claims, 9 Drawing Sheets

(56) References Cited

U.S. PATENT DOCUMENTS

| | | | | |
|---|---|---|---|---|
| 603,422 | A | * | 5/1898 | Burkhardt ............ B62H 3/00 211/22 |
| 627,751 | A | * | 6/1899 | Hayden ............... B62H 3/02 211/21 |
| 648,402 | A | * | 5/1900 | Haarmann et al. ...... B62H 3/04 211/21 |
| 657,973 | A | * | 9/1900 | Warner ............... B62H 3/04 211/21 |
| 2,719,632 | A | | 3/1952 | Sill |
| 3,603,459 | A | | 9/1971 | Erb |
| 3,907,114 | A | | 9/1975 | Ewers |
| 3,941,406 | A | * | 3/1976 | Eggleston ............ B60P 3/07 410/3 |
| 4,047,614 | A | | 9/1977 | Radek |
| 4,148,504 | A | * | 4/1979 | Rushing .............. B60R 21/13 182/153 |
| 6,948,621 | B1 | * | 9/2005 | Lassanske ............ B62H 3/06 211/21 |
| 7,055,700 | B2 | | 6/2006 | West |
| 9,650,092 | B1 | | 5/2017 | Sheng |
| 2011/0220594 | A1 | | 9/2011 | Chuang |
| 2012/0111070 | A1 | * | 5/2012 | Khairallah ........... B62H 3/02 70/233 |
| 2012/0111911 | A1 | * | 5/2012 | Rempe ................ B60P 3/07 224/403 |

FOREIGN PATENT DOCUMENTS

| | | |
|---|---|---|
| GB | 451367 A1 | 8/1936 |
| GB | 2312882 A | 11/1997 |
| GB | 2504117 A1 | 1/2014 |
| NL | 6810339 A1 | 1/1970 |
| TW | M521573 U | 5/2016 |

OTHER PUBLICATIONS

UKIPO Search Report dated Sep. 20, 2017 for Corresponding GB Application No. GB1701618.9.

* cited by examiner ical field

The present disclosure relates to a stand and method for locating a wheel of a wheeled vehicle, preferably a two wheeled vehicle, and particularly but not exclusively for locating one or a plurality of manually propelled bicycles in a vehicle for transporting the bicycle or bicycles.

SUMMARY

In a first exemplary embodiment, there is provided a stand for locating a wheeled vehicle, the stand comprising front and rear locating structures for receiving a wheel of a wheeled vehicle and providing three pairs of cooperating locating surfaces for locating the wheel between the cooperating locating surfaces, in which the said three pairs of cooperating locating surfaces comprise a front lower pair of cooperating locating surfaces provided by the front locating structure, a rear lower pair of cooperating locating surfaces provided by the rear locating structure, and a front upper pair of cooperating locating surfaces provided by the front locating structure and arranged so as to be positioned above the lower pairs of cooperating locating surfaces, when the stand is standing on a horizontal support surface in use, in which the front locating structure has an intermediate opening, positioned between the front lower pair of cooperating locating surfaces and the front upper pair of cooperating locating surfaces, which has a width greater than the distance between the cooperating locating surfaces of each front pair of cooperating locating surfaces, to allow the axle of a wheel to pass into the stand through the front locating structure, and in which the two lower pairs of cooperating locating surfaces are positioned asymmetrically relative to the upper pair of cooperating locating surfaces with the horizontal distance between the front lower pair of cooperating locating surfaces and the front upper pair of cooperating locating surfaces being greater than the horizontal distance between the rear lower pair of cooperating locating surfaces and the front upper pair of cooperating locating surfaces.

In a second exemplary embodiment, there is provided a method of locating a wheeled vehicle comprising: inserting a wheel of the wheeled vehicle into a stand which comprises a framework providing three pairs of cooperating locating surfaces for locating the wheel between the cooperating surfaces of each pair, and locating the wheel between the respective cooperating surfaces of the said three pairs of cooperating locating surfaces at positions spaced apart around the circumference of the wheel, by moving the wheel axle in a motion through a plane which includes the upper and a front one of the lower pairs of cooperating locating surfaces, in a direction towards the other, rear, lower pair of cooperating locating surfaces, the said plane being inclined towards the rear lower pair of cooperating surfaces at an angle to the horizontal in the range of 20° to 50°.

In a third exemplary embodiment, there is provided a stand for locating a wheeled vehicle, comprising front and rear locating structures for receiving a wheel of a wheeled vehicle and providing three pairs of cooperating locating surfaces for locating the wheel between the cooperating surfaces, in which the said three pairs of cooperating surfaces comprise a front lower pair of cooperating surfaces provided by the front locating structure, a rear lower pair of cooperating surfaces provided by the rear locating structure, and a front upper pair of cooperating surfaces provided by the front locating structure and positioned above the lower pairs, when the stand is standing on a horizontal support surface, in which the front locating structure has an intermediate opening, positioned between the front lower pair of cooperating surfaces and the front upper pair of cooperating surfaces, which has a width greater than the distance between the cooperating surfaces of each front pair of cooperating surfaces, to allow the axle of a wheel to pass into the stand through the front locating structure, and in which the front locating structure extends substantially in a single flat plane, and in which, when the stand is standing on a horizontal support surface, the angle between the front locating structure and the horizontal is less than 60 degrees.

In a fourth exemplary embodiment, there is provided a stand for locating a wheeled vehicle, comprising front and rear locating structures for receiving a wheel of a wheeled vehicle and providing three pairs of cooperating locating surfaces for locating the wheel between the cooperating surfaces, in which the said three pairs of cooperating surfaces comprise a front lower pair of cooperating surfaces provided by the front locating structure, a rear lower pair of cooperating surfaces provided by the rear locating structure, and a front upper pair of cooperating surfaces provided by the front locating structure and positioned above the lower pairs, 19 when the stand is standing on a horizontal support surface, in which the front locating structure has an intermediate opening, positioned between the front lower pair of cooperating surfaces and the front upper pair of cooperating surfaces, which has a width greater than the distance between the cooperating surfaces of each front pair of cooperating surfaces, to allow the axle of a wheel to pass into the stand through the front locating structure, and in which the front locating structure extends substantially in a first single flat plane, and the rear locating structure extends substantially in a second single flat plane, and the front and rear locating structures 2, 1 are arranged to converge towards each other in an upward direction when the stand is standing on a horizontal support surface, and in which, when the stand is standing on a horizontal support surface, the angle between the front locating structure and the horizontal is less than the angle between the rear locating structure and the horizontal.

In a fifth exemplary embodiment, there is provided a stand for locating a wheeled vehicle, comprising front and rear locating structures for receiving a wheel of a wheeled vehicle and providing three pairs of cooperating locating surfaces for locating the wheel between the cooperating surfaces, in which the said three pairs of cooperating surfaces comprise a front lower pair of cooperating surfaces provided by the front locating structure, a rear lower pair of cooperating surfaces provided by the rear locating structure, and a front upper pair of cooperating surfaces provided by the front locating structure and positioned above the lower pairs, when the stand is standing on a horizontal support surface, in which the front locating structure has an intermediate opening, positioned between the front lower pair of cooperating surfaces and the front upper pair of cooperating surfaces, which has a width greater than the distance between the cooperating surfaces of each front pair of cooperating surfaces, to allow the axle of a wheel to pass into the stand through the front locating structure, and in which the first locating structure is a substantially rigid, substantially flat planar structure with the said front pairs, of cooperating locating surfaces being provided by edges of the structure which locate the wheel in use substantially without deformation of the flat planar structure during entry and exit of the wheel.

In a sixth exemplary embodiment, there is provided a stand for locating a wheeled vehicle, comprising front and rear locating structures for receiving a wheel of a wheeled vehicle and providing three pairs of cooperating locating surfaces for locating the wheel between the cooperating surfaces, in which the said three pairs of cooperating surfaces comprise a front lower pair of cooperating surfaces provided by the front locating structure, a rear lower pair of cooperating surfaces provided by the rear locating structure, and a front upper pair of cooperating surfaces provided by the front locating structure and positioned above the lower pairs, when the stand is standing on a horizontal support surface, in which the cooperating surfaces of the front upper pair of cooperating surfaces are provided by a first locating component defining an upwardly extending opening, and by a second locating component defining a region in which the cooperating surfaces converge towards each other in an upward direction so as to engage wheels of differing widths, the second locating component being movable towards and away from the lower end of the upwardly extending opening so as to engage wheels of differing diameters. Preferably, the upwardly extending opening is an elongate opening of substantially constant width and the second locating component is movable along the elongate opening towards and away from the lower end of the elongate opening.

BRIEF DESCRIPTION OF THE DRAWINGS

Examples of embodiments will now be described by way of example with reference to the accompanying drawings in which: —

DETAILED DESCRIPTION

Figure 1:
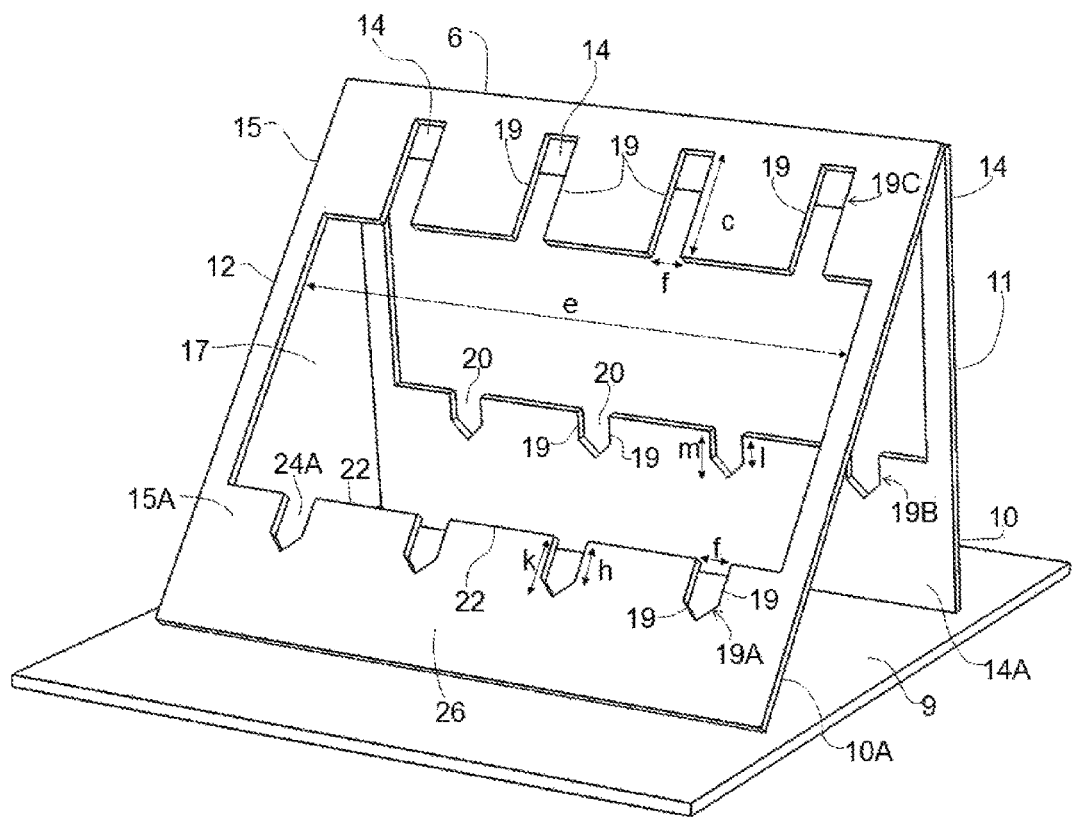
FIG. 1 is a perspective representation of an example of a stand for supporting a plurality of bicycles.
Figure 1A:
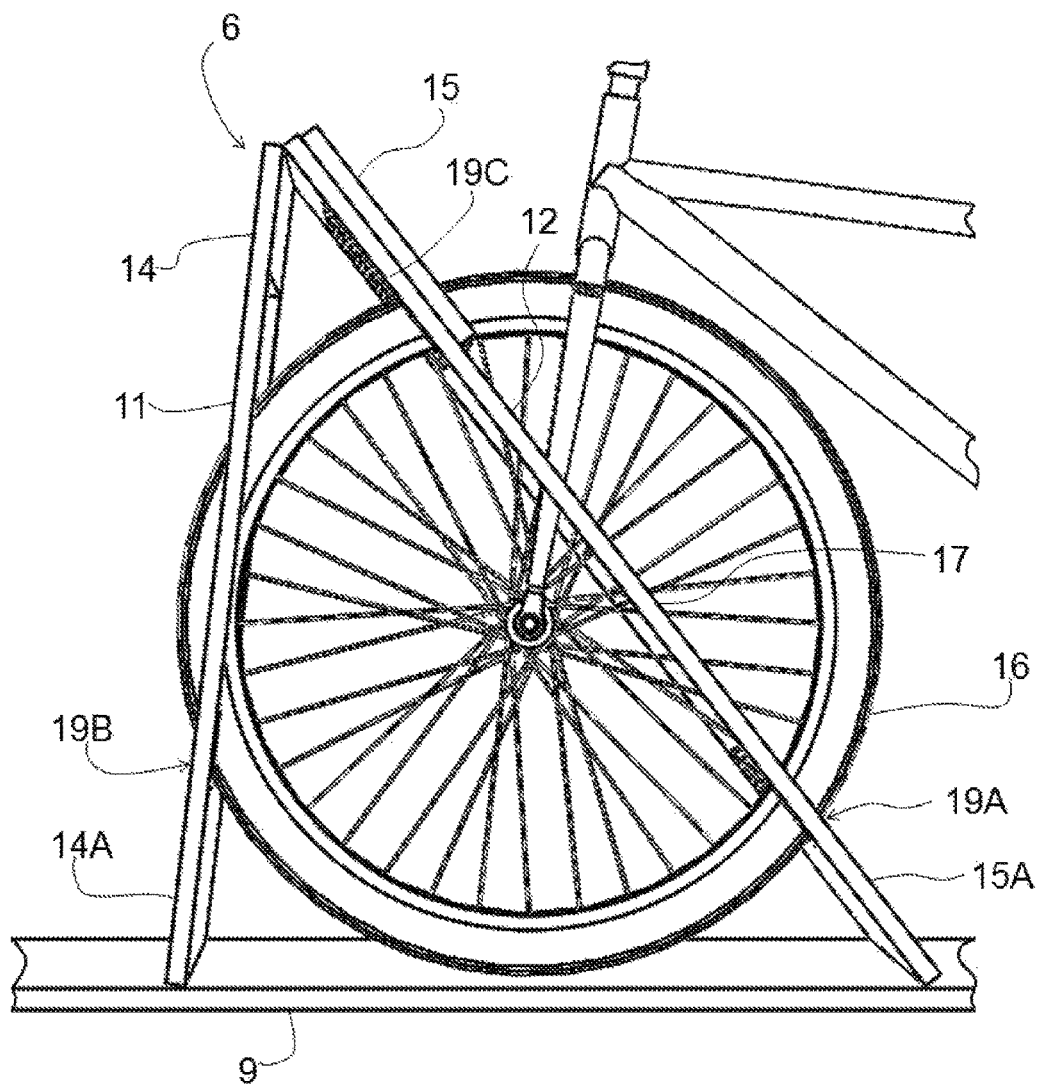
FIG. 1(a) is a side view of the stand shown in FIG. 1.
Figure 1B:
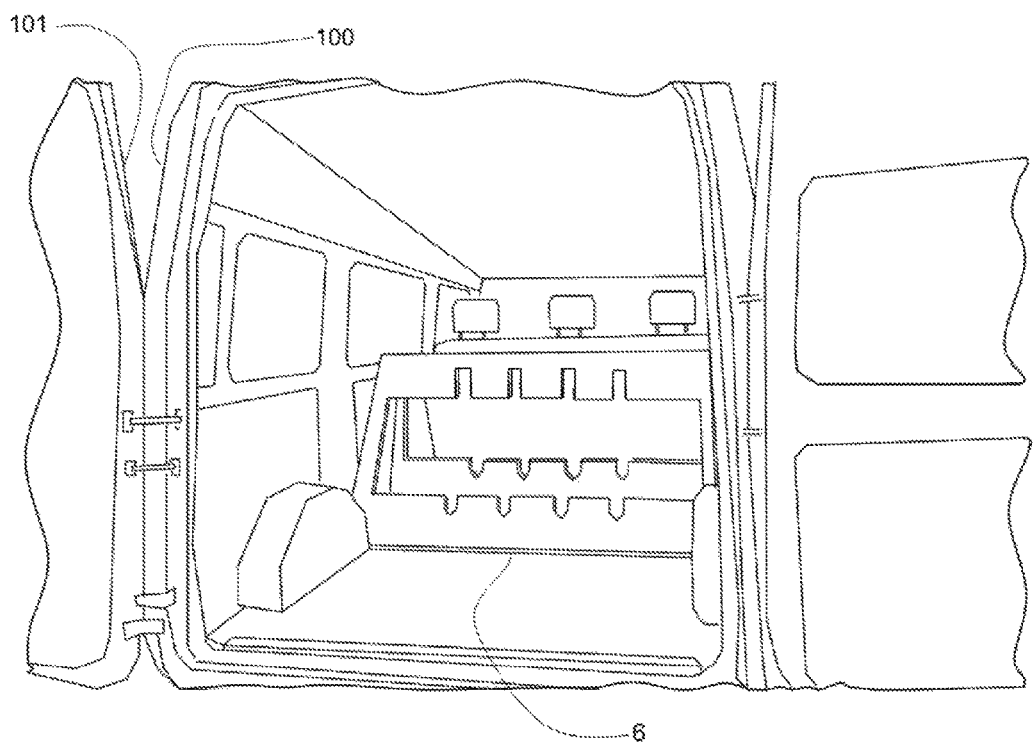
FIG. 1(b) shows schematically a rear view of a transport vehicle having the stand shown in FIG. 1 mounted therein.

Referring to the embodiments described briefly above, in some examples it is arranged that, in use with the stand standing on a horizontal support surface, the front locating structure is inclined towards the rear structure at an angle to the horizontal in the range of 20° to 50°, more preferably in the range 25° to 45°.

In some examples there is provided a stand in which the front locating structure also extends substantially in a first single flat plane, and the rear locating structure extends substantially in a second single flat plane, and in which the front and rear locating structures are arranged to converge towards each other in an upward direction when the stand is standing on a horizontal support surface, and in which, when the stand is standing on a horizontal support surface, the angle between the front locating structure and the horizontal is less than the angle between the rear locating structure and the horizontal. In some examples both the front and rear locating structures are arranged to be inclined to the vertical when the stand is standing on a horizontal support surface. In some examples, the rear locating structure is inclined away from the vertical towards the front locating structure at an angle to the vertical in the range of 3° to 10°, or in the range 5° to 7° in some examples.

Some examples described herein are particularly applicable to provide a simple, inexpensive, and lightweight structure for use in a transport vehicle such as a van or a towed trailer, for example for transporting one or more bicycles. In one such simple form, it may be arranged for example that the front locating structure is a substantially rigid, substantially flat planar structure and that the said front pairs of cooperating locating surfaces are provided by edges of the front locating structure which locate the wheel in use substantially without deformation of the flat planar structure during entry and exit of the wheel.

Other features will now be set out which may be applied generally to examples described herein.

In order to enhance stabilization of the wheel which is located by the stand, there may be provided an arrangement to accommodate wheels of differing widths and differing diameters. In accordance with this example feature the cooperating locating surfaces of the front upper pair of cooperating locating surfaces are provided by a first locating component defining an upwardly extending opening, and by a second locating component defining a region in which the cooperating locating surfaces converge towards each other in an upward direction so as to engage wheels of differing widths, the second locating component being movable towards and away from the lower end of the upwardly extending opening so as to be able to engage wheels of differing diameters. In some examples, the upwardly extending opening is an elongate opening of substantially constant width and the second locating component is movable along the elongate opening towards and away from the lower end of the elongate opening.

In some examples, the stand is such that when in use a wheel is engaged by the said three pairs of cooperating locating surfaces, the points of contact of the pairs of cooperating locating surfaces with the wheel are spaced apart such that the angle subtended at the wheel axle by the contact points of any two circumferentially adjacent pairs of cooperating surfaces is in the range 60° to 140°, or in the range 100° to 140° in some examples, or in the range 110° to 130° in some examples.

As has been mentioned, examples of the stand find particular application where the stand is adapted to support a plurality of wheeled vehicles, and the front and rear locating structures have arrays of locating components positioned across the locating structures to receive an array of wheels. Conveniently in an example of such a stand it is arranged that the front locating structure and the rear locating structure are each formed of a respective flat sheet of material, the rear locating structure having its lower rear cooperating locating surfaces formed by a comb-like structure having projecting teeth which form between adjacent teeth the cooperating locating surfaces, and the front locating structure having its upper and lower cooperating locating surfaces formed by upper and lower comb-like structures having projecting teeth which form between adjacent teeth the cooperating locating surfaces, the front locating structure having a middle opening extending across the structure between its upper and lower locating surfaces, so as to allow the axles of wheels to pass through the front locating structure and having the periphery thereof located by the upper and lower pairs of cooperating locating surfaces.

In some examples the pairs of cooperating locating surfaces may be arranged and positioned such that when a wheel is engaged in use by the various pairs of cooperating locating surfaces with the stand on a horizontal support surface, the said front locating structure is positioned to extend in a region passing over the axle of the engaged wheel.

Features of examples of the stand which are set out in connection with an apparatus aspect may also be provided where applicable in connection with a method aspect.

Referring now to FIGS. 1 to 4, and in particular to FIGS. 1, 1(*a*) and 2, there is shown an example of a bicycle stand 6 according to the present disclosure, shown standing on a supporting surface 8 which in the example shown is a horizontal supporting surface such as the floor of a vehicle or horizontal ground. An example of the stand 6 being located in a vehicle 100 is shown schematically in FIG. 1(*b*). In this example, the vehicle 100 is a truck or van 100, having rear doors 101 which can be opened to allow access to the interior in which the stand 6 is located. In other examples, the transport vehicle may be a trailer suitable for towing by a vehicle, a pick-up truck (which may for example have an open rear portion in which the stand 6 may be located), etc.

The stand comprises a rear locating structure 11 and a front locating structure 12. Each locating structure 11, 12 is formed of a flat sheet of material in which a number of openings are formed. The material may be for example plywood, metal, plastics, etc. The rear locating structure 11 has an array of slots 20 formed in the sheet having a width suitable to receive a bicycle wheel 16 when the bicycle is inserted into the stand through openings in the front locating structure 12 towards the rear locating structure 11. The rear locating structure 11 is positioned generally upright relative to the level of ground, preferably at a slight angle C to the vertical 7 (indicated in FIG. 2).

The rear locating structure 11 comprises an upper linking component 14 in the region of the upper part of the locating structure 11, and a lower locating component 14A, positioned in the region of a lower part of the locating structure 11. The upper linking component 14 is linked, conveniently by a hinge, to an upper region of the front locating structure 12. At a lower part of the rear locating structure 11 the lower locating component 14A provides an array of pairs of cooperating locating surfaces 19 on opposite sides of the openings 20, positioned to locate a bicycle wheel. The rear locating structure 11 extends downwardly to the supporting surface 8 at a first base region 10.

The front locating structure 12 is also formed of a flat sheet of material. The material may be for example plywood, metal, plastics, etc. The front locating structure 12 is positioned to extend between the top of the rear locating structure 11 and a second base position 10A on the supporting surface 8 in FIG. 2, the position 10A being spaced from the first position 10 at the base of the rear locating structure 11. The front locating structure 12 is in this example inclined to the horizontal at a much lesser angle then the rear locating structure 11. For example, the angle may be in the range 20 to 40°, or approximately 30° in an example.

The rear locating structure 11 and front locating structure 12 are connected together at their base regions 10 and 10A by a base structure 9. The base structure 9 may be formed of a number of battens resting on the support surface 8. Alternatively the first and second locating structures can be stabilized and linked together by a flexible and non-elastic link such as a chain or by a hinge mechanism (not shown) such as is used in a stepladder. This can be located off the ground, for example one third of the distance up the locating structures 11 and 12.

The front locating structure 12 has an upper locating component 15 and a lower locating component 15A. Each locating component 15,15A is formed as a comb like structure having projecting teeth 22 which form, between adjacent teeth, openings 24, 24A, providing the upper and lower pairs of cooperating locating surfaces 19 for locating a bicycle wheel between the cooperating locating surfaces. The front locating structure 12 also has a middle opening 17 extending across the upper and lower locating components 15, 15A so as to allow the axles of bicycle wheels to pass through the front locating structure 12, but to have the periphery thereof located by the upper and lower pairs of cooperating locating surfaces 19 in the openings 24, 24A between the teeth 22 of the comb like structures.

Figure 2:
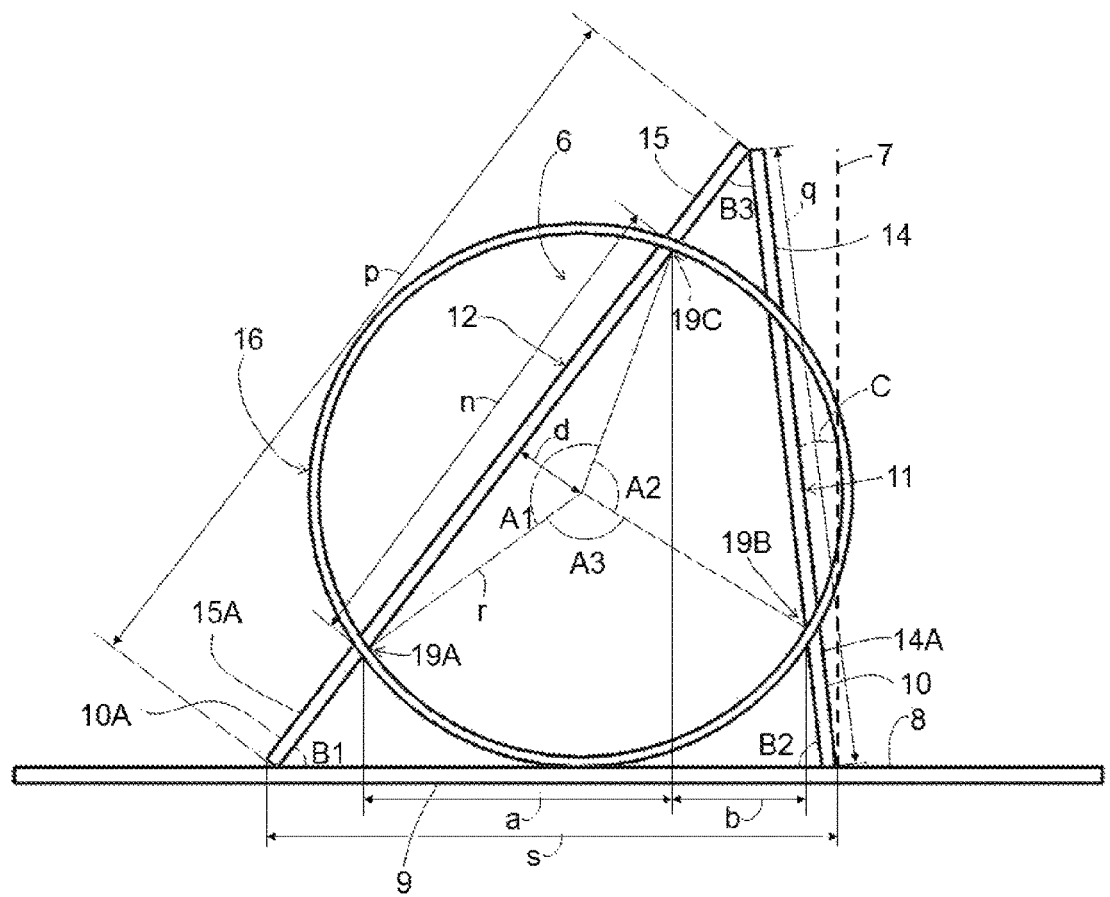
FIG. 2 is a diagrammatic representation of a side view of the stand shown in FIG. 1 indicating dimensions and angles.
Figure 3:
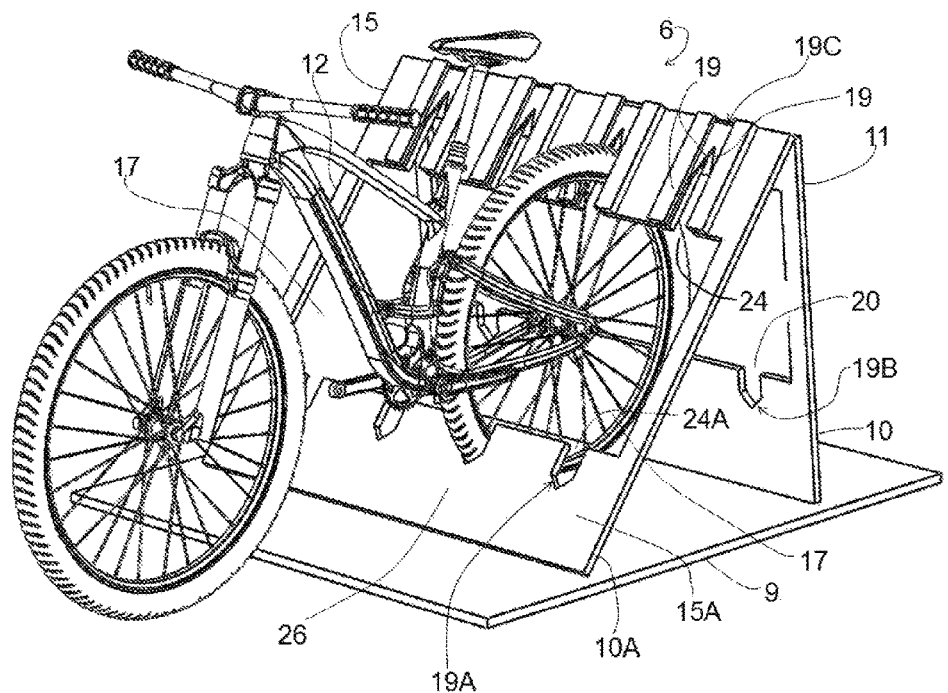
FIG. 3 is a diagrammatic perspective view of the bicycle stand shown in FIG. 1 with a bicycle in the stand.
Figure 4:
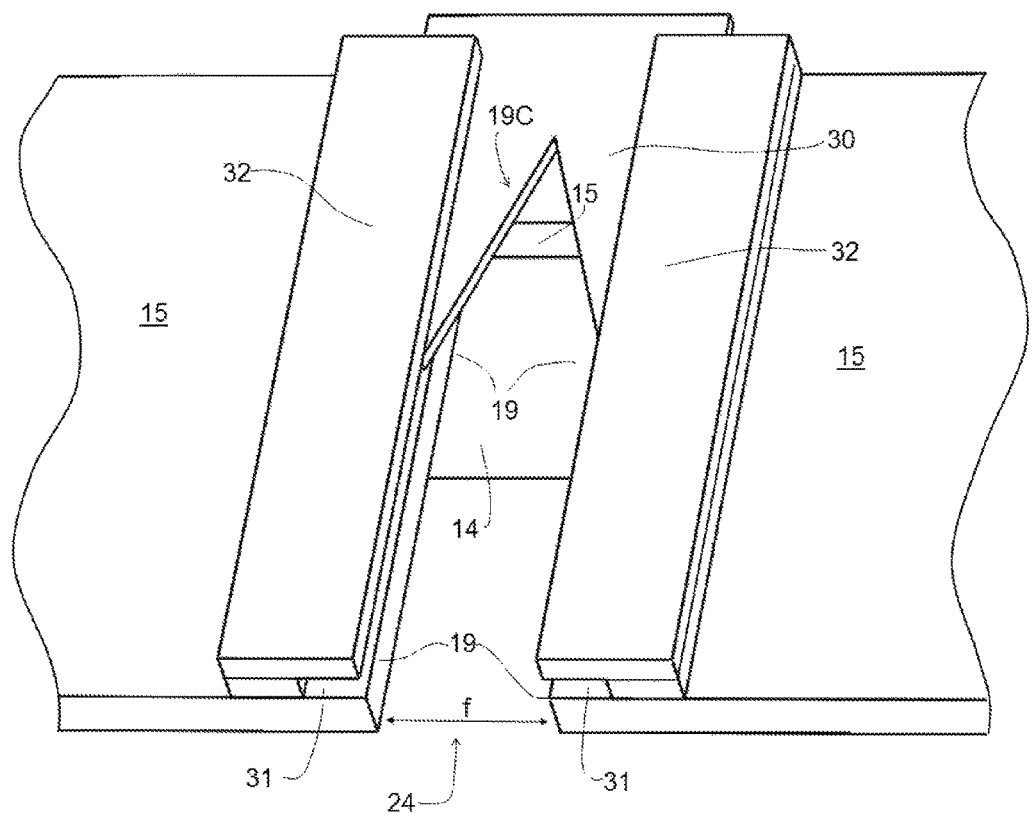
FIG. 4 is a perspective view of a modification of the front upper part of the stand as shown in FIG. 1, including a movable component for assisting in location of a wheel.

As shown in the example illustrated in detail in FIGS. 3, and 4, a bicycle may be located in the rack by passing one of its wheels (either its front wheel or its back wheel) into the bike rack 6. The wheel of the bicycle may be lifted or rolled over the lower part of the front locating structure 12, into the opening between the teeth 22 of the lower comb like structure 15A, and then moved forwardly into the rack until located as can be seen diagrammatically in FIG. 2. The wheel is then located by three sets of cooperating locating surfaces 19 which are distributed around the periphery of the circumference of the wheel. In the example shown the rear locating structure 11 is inclined away from the vertical (shown at dotted line 7) by a small acute angle, towards the front locating structure 12. Arranging the first locating structure in this way rather than vertically allows the positions at which the cooperating locating surfaces 19 grip the wheel to be more evenly distributed around the circumference of the wheel.

In some examples, the lower locating component 15A of the front locating structure 12 includes an upwardly extending portion 26 positioned below the cooperating locating surfaces of the lower component 15A of the front locating structure 12 and transverse thereto, positioned to engage a wheel located by the pairs of locating surfaces of the lower component 15A of the front locating structure 12 and to prevent or inhibit the wheel rolling away from the rear locating structure 11 out of engagement with the stand. In some examples, when a bike front or rear wheel is located between the various pairs of cooperating locating surfaces 19, the bike is not merely wheeled into the locating surfaces, but has to be lifted up and dropped into the openings in the front locating structure 12. This allows a considerable stabilizing effect on the bike in that it is not only held from side to side by the cooperating locating surfaces 19 but is also prevented from rolling by locating against the bottom of the opening 20 in the rear locating structure 11, and is prevented from rolling by locating against the bottom of the opening 24A between the teeth 22 of the front locating structure 12.

Although the bike will normally be lifted into the main opening 17 when being inserted into the rack, it may also conveniently be rolled into the opening 17 up and over the base part of each opening 24A between the lower teeth 22, if this is more convenient. Thus one of the benefits of an example described herein is that the bike is prevented from rolling out of the stand once it is installed. In an example the lower area of the openings in the lower locating component 15A has a minimum height in the range 5 to 10 cm to assist in achieving that.

Figure 3A:
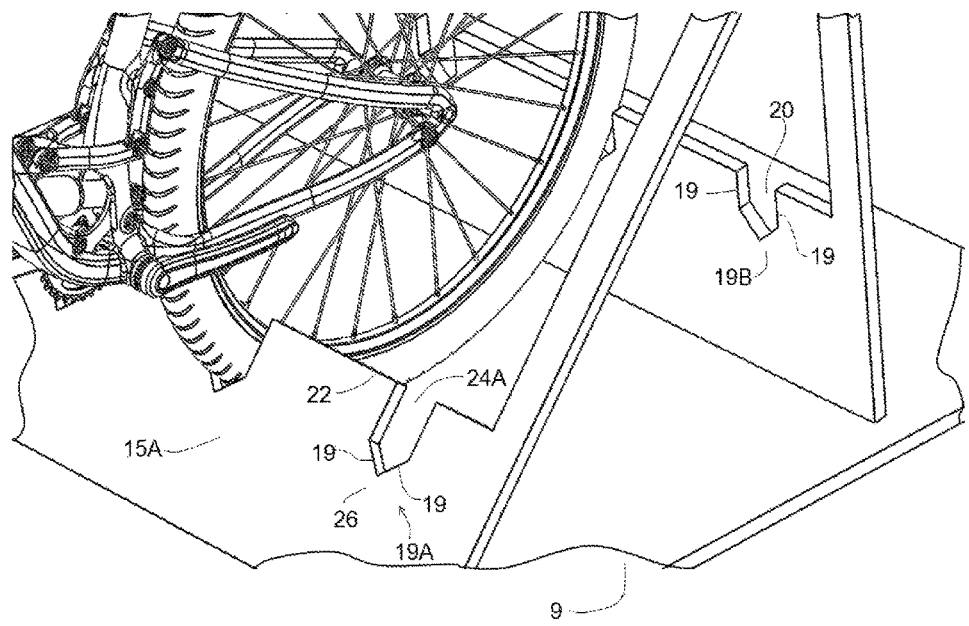
FIG. 3(a) is a detail view of the bicycle stand shown in FIG. 3 with a bicycle in the stand.

As is shown in FIGS. 1, 3 and 3a, the lower openings 24a on the front locating structure 12, and the lower openings 20 on the rear locating structure 11, in an example each consist of a portion of substantially parallel edges and an inner portion of converging edges. Thus the cooperating locating surfaces 19 of these openings are formed in this example with the inner part of the opening providing cooperating locating services which converge towards each other. In some examples the openings define opposed cooperating surfaces which are partly parallel and partly converging. An advantage of the converging edges is that the tire of a wheel tends to locate in a more stable manner in the V shape part of the opening.

As shown in FIGS. 1 and 3, the upper openings 24 in the front locating structure 12 are parallel sided throughout the openings in an example. In this case the wheel is located by opposed locating surfaces which are substantially parallel. Another alternative is that in some circumstances it may be sufficient to provide parallel sided openings in the lower parts of the first and second locating structures, and sufficient stability will be given.

Although examples described herein are principally concerned with providing three, and only three, pairs of cooperating locating surfaces for a wheel, it is to be appreciated that some examples may be provided in which one or more further pairs of cooperating locating services are provided in addition to the three pairs of locating services. For example there may be provided a modification of the example of FIGS. 1 and 2 in which four pairs of cooperating locating surfaces are provided, and in which the cooperating surfaces of each pair are parallel opposed surfaces. In this example, slots are provided in the upper linking component 14 which forms an upper locating component of the rear locating structure 11.

In some examples, the pairs of cooperating locating surfaces 19 may have differing transverse separation distances between the surfaces, the arrays having a corresponding pattern of widths to allow engagement of wheels of different widths between corresponding pairs of cooperating locating surfaces. Thus in such examples the stand can be arranged to accommodate multiple types of bike of different wheel size and width, by chosen selection of cut outs from the sheets forming the first and second locating structures. For example, a series of racing bicycles having narrow tires can be accommodated between a series of narrow openings between teeth. The same bicycle stand can then be used on another occasion to store a series of mountain bikes having much thicker tires, by utilizing the different, wider, openings. Also various mixtures of bikes can be accommodated. Such a stand provides within compact dimensions the possibility of a number of different combinations of bikes, whilst utilizing the full width of the stand for wider components of the bikes, such as handlebars. In this connection it will be appreciated that bikes can be accommodated with some of them facing forwardly into the bike rack and alternate ones facing outwardly from the bike rack.

Figure 5A:
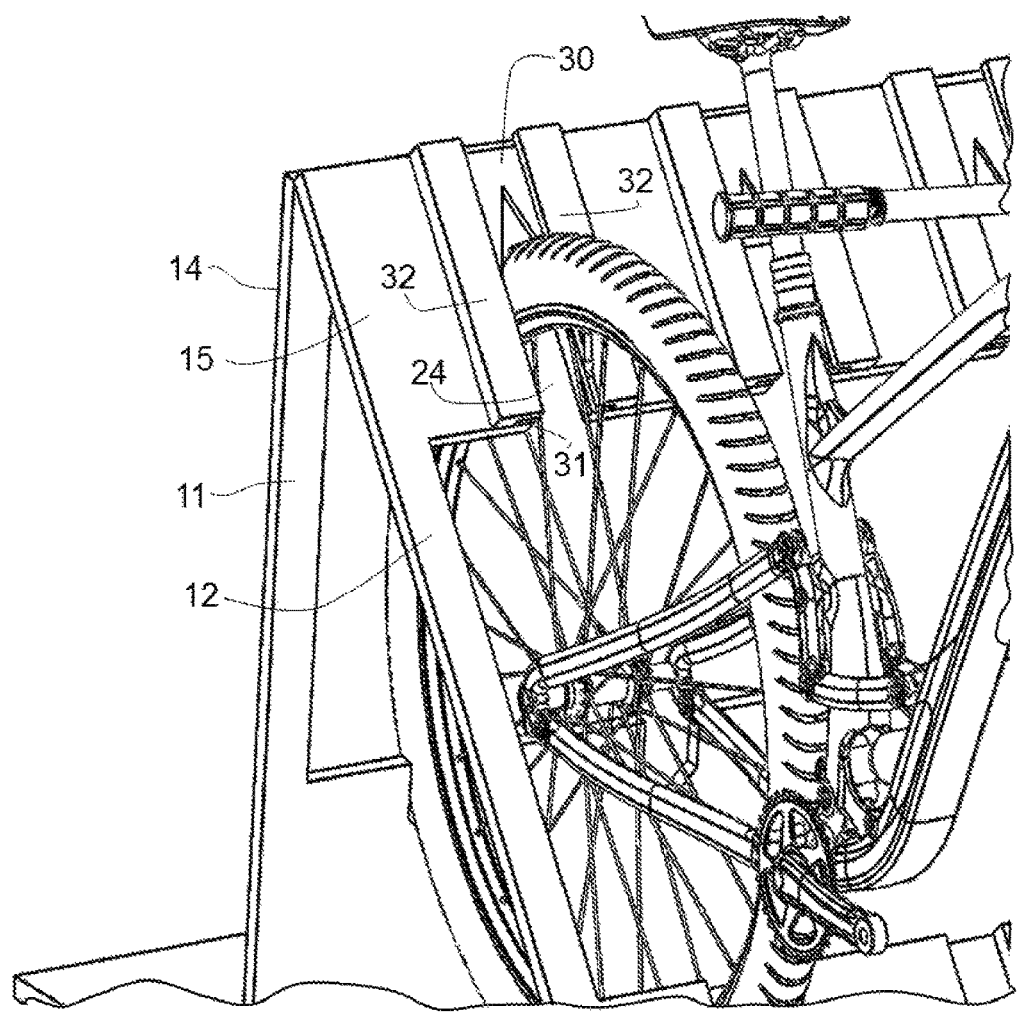
FIG. 5(a) shows the modification of FIG. 4 with a wide tire wheel engaged by the movable component.
Figure 5B:
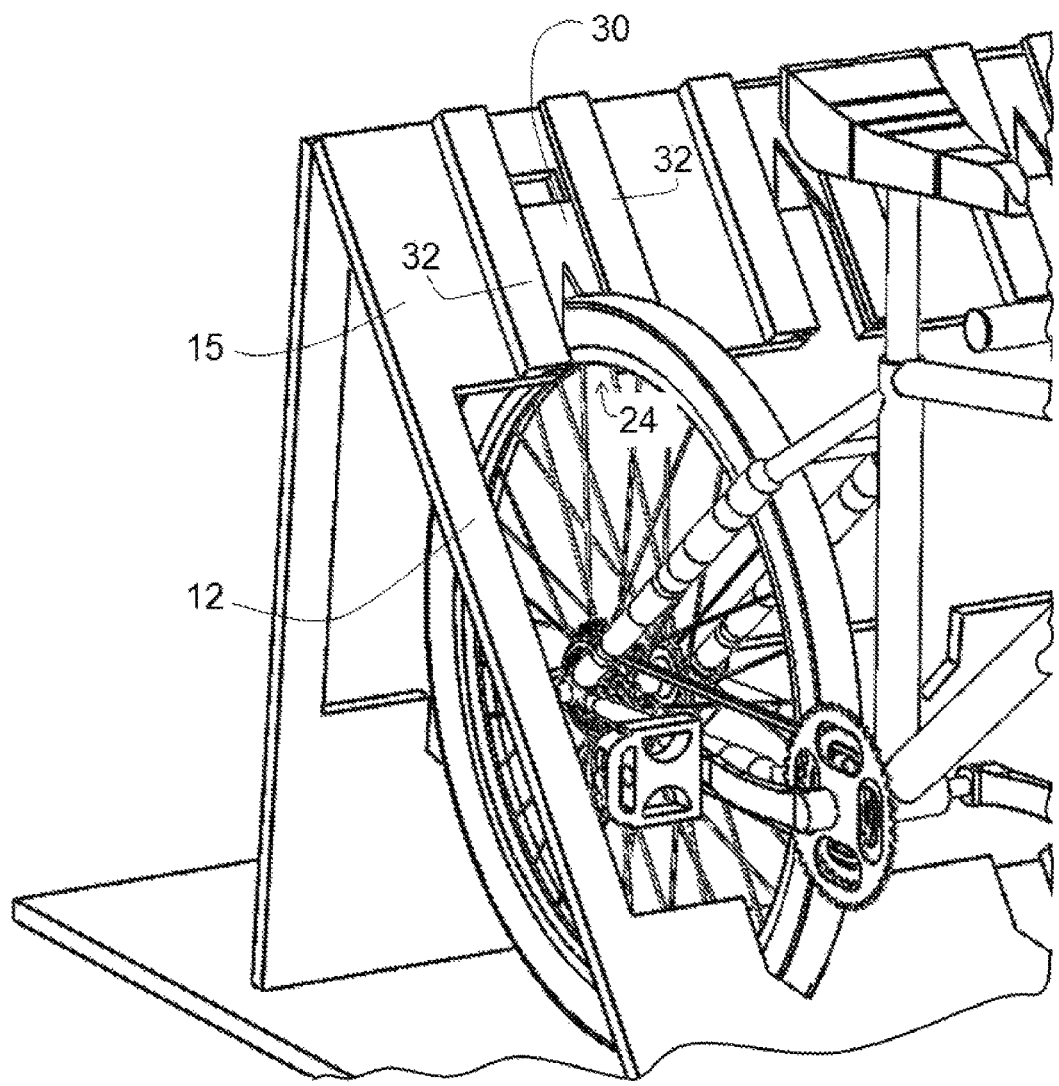
FIG. 5(b) shows the modification of FIG. 4 with a narrow tire wheel engaged by the movable component.

In FIGS. 4, 5(a) and 5(b) there is shown another example of arranging the upper pairs of cooperating surfaces 19C for accommodating tires of different widths. In this example, the cooperating surfaces 19 of the front upper pair 19C of cooperating surfaces are provided partly by the upper locating component 15 which defines an upwardly extending elongate opening 24 of substantially constant width (f), and partly by a movable component 30 defining a region in which the cooperating surfaces 19 converge towards each other in an upward direction. The converging cooperating surfaces 19 in this example form a V shape. This allows the V shape component to engage wheels of differing widths. The second component is movable along the elongate opening 24 towards and away from the front lower pair of cooperating surfaces within tracks 31 provided one on each side of the component 30 by flanges 32 spaced from the upper locating component 15 and overlapping the movable component 30. This allows the sliding component 30 to engage wheels of differing diameters. The sliding component 30 may operate by gravity to move down onto the wheel and/or may be moved manually and secured by a clamping nut and bolt (not shown). In FIG. 5 (a) there is shown a mountain bike with a relatively wide tire secured with the movable component 30 positioned relatively high up in the tracks 31 so that the wider, lower portions of the V-shape engage the wide tire. In FIG. 5 (b) there is shown a racing bike with a relatively narrow tire, secured with the movable component 30 positioned relatively low down in the tracks 31 so that the narrower, higher portions of the V shape engage with the narrower tire.

It will be appreciated that where the cooperating surfaces 19 of the upper pair 19C of cooperating surfaces are provided partly by edges of the opening 24 in FIG. 4, in an example it is not essential for the edges of the opening to be parallel. The cooperating surfaces 19 provided by the upper locating component 15 in FIG. 4 may for example be slightly converging in the upward direction or of other varying shape. The purpose of the fixed cooperating surfaces 19 provided by the upper locating component 15 in FIG. 4 is to retain the wheel in an approximate location after the front or rear wheel has been rolled into position, until the movable component 30 is moved downwardly towards the wheel, to provide final stabilization of the wheel. When the wheel is rolled into position, the cooperating surfaces 19 provided on each side of the opening 24 hold the wheel approximately in place without the need for it to be held by hand by the operator, while the movable component 30 is moved downwardly to secure the wheel.

In some examples, the pairs of cooperating locating surfaces 19 are arranged and positioned such that when a wheel is engaged in use by the various pairs of cooperating locating surfaces with the stand on a horizontal support surface, the said front locating structure 12 is positioned to extend in a region passing over the axle of the engaged wheel. This can be arranged to provide that the wheel of the bicycle is located at three locating regions which are spaced around the circumference of the wheel more evenly than is found generally in previous stands. The middle opening 17 gives the ability of the wheel axle to be moved through the plane of the front locating structure 12 to the preferred position.

Thus in accordance with a method aspect described herein there may be provided a method of locating a wheeled vehicle. By way of example, with reference to FIGS. 1 to 4 as have been described, the method may comprise inserting a wheel of the wheeled vehicle into a stand which comprises a framework 11, 12 providing three pairs of cooperating locating surfaces 19 for locating the wheel between the cooperating surfaces of each pair, and locating the wheel between the respective cooperating surfaces of the said three pairs of cooperating locating surfaces at positions spaced apart around the circumference of the wheel, by moving the wheel axle in a motion through a plane which includes the upper and a front one of the lower pairs of cooperating locating surfaces 19, in a direction towards the other, rear, lower pair of cooperating locating surfaces, the said plane being inclined towards the rear lower pair of cooperating surfaces at an angle B1 to the horizontal in the range of 20° to 50°.

Although there are many ways of manufacturing a stand as described herein, there are a number of advantages where the first and second locating structures and the base structure are formed of flat sheet material. For example, the front and rear locating structures and the base structure may be linked together by hinges. Various brackets, clips and stays may be used to secure the flat sheets in place when in use, and may be removed for storage allowing the flat sheets to be folded into a single planar structure for storage. In some examples, the front and rear locating structures 11, 12 and the base structure 9 include coupling components allowing the stand to be folded substantially flat when not in use.

Figure 6:
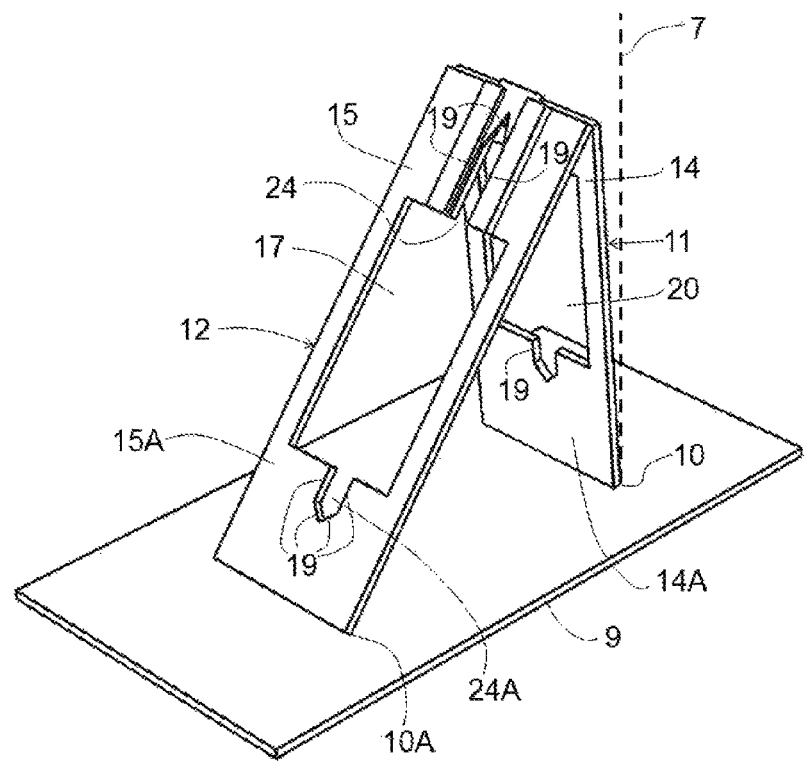
FIGS. 6 and 7 show an embodiment of the bicycle stand of FIGS. 1 to 4, intended for supporting a single bicycle.
Figure 7:
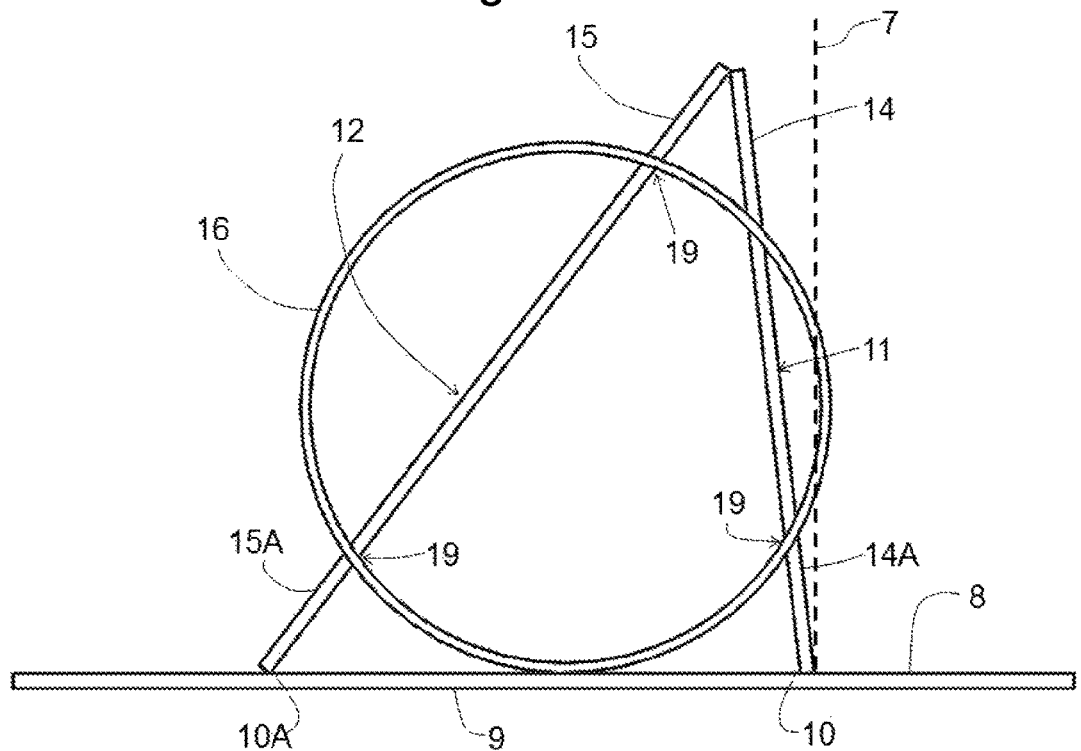

Another example will now be described with reference to FIGS. 6 and 7, which correspond generally to FIGS. 1 and 2 and in which like main, elements are indicated by like reference numerals. FIG. 6 shows a bicycle stand for locating only one bicycle. In similar manner to the example of FIGS. 1-5, in FIGS. 6 and 7 a larger middle opening 17 is formed in the front locating structure 12 and this links upper and lower openings 24 and 24A which face each other, allowing a bicycle wheel to be placed into the stand. The axle of the wheel passes through the middle opening 17 and the rim of the wheel is located by the upper and lower openings 24, 24A which face each other. Although in use the wheel is located by the upper and lower locating components 15, 15A of the front locating structure 12, only the front part of the wheel is engaged with the rear locating structure 11, so that a simple slot in the rear locating structure 20 is sufficient. The axle of the wheel does not have to pass through the slot in the rear locating structure 11.

Although it is convenient that the front and rear locating structures are made from flat sheets of material, for example such as plywood, the entire structure can be manufactured of tubular material such as tubular steel or aluminum or other material. For example the lower locating component 15A of the front locating structure 12 may be formed by a single tubular structure which traces out the contour of the comb like structure. Also there is no need for the upper locating component 15 to be directly joined to the lower locating component 15A. Numerous other materials and methods of constructing the slots and openings can be provided within the scope of the present disclosure In some examples the pairs of cooperating locating surfaces are spaced around the periphery of the wheel of the vehicle so as to be located as evenly as possible. Although maximum stability may be obtained by having of the pairs of cooperating surfaces equally spaced around the perimeter, this may not be practical for purposes of entry and exit of the wheel into the stand, nor for stability of the stand overall together with lightness and the storage. Thus in some examples the rear locating structure is inclined to the vertical at a much lesser angle then the front locating structure. The entry of the wheel into the stand is firstly through the openings in the front locating structure and then towards the rear locating structure. It is found that the overall structure of the stand is more robust and stable if the rear locating structure is inclined to the vertical to a much lesser extent then the front locating structure, even though this tends to move the location of the pairs of locating surfaces away from an apparently ideal arrangement of the pairs being equally spaced around the wheel. Another factor is that if the rear locating the structure is inclined to the vertical at a much lesser angle than the front locating structure, the overall height of the stand can be much reduced. This can assist in enabling the stand to be located in a transport vehicle where the height of the roof of the vehicle may be a limiting factor.

In some examples the pairs of cooperating locating surfaces hold the wheel against movement about a vertical axis perpendicular to the wheel axis, and about a horizontal axis perpendicular to the wheel axis. In such examples the positions of the cooperating locating surfaces may be arranged so that the pairs of surfaces are widely spaced from a vertical axis passing through the wheel axis and also widely spaced from a horizontal axis passing through the wheel axis perpendicular to the wheel axis. Particularly when a bike is being transported in a vehicle, movement tends to be from side to side by movement about the steering stem of the bicycle, and from side to side produced by rocking motion of the vehicle. These factors are taken into account by the example proportions set out above.

Furthermore it is to be appreciated that in some arrangements there may be provided more than three pairs of cooperating locating surfaces around a wheel. In some examples, it may assist in providing greatest stability to provide a fourth pair of cooperating locating surfaces. One way that this can be done is by providing additional openings in the rear locating structure 11, along the upper part of thereof. In such a case there may be provided across the stand an array of openings, conveniently parallel sided openings, corresponding to the openings 24 in the upper part of the front locating structure.

There is set out in the form of a table examples of various dimensions and angles which may be used in the examples of the stand shown in the drawings:—

|  | MTB | ROAD | MTB | ROAD | MTB* | ROAD* |
|---|---|---|---|---|---|---|
| ANGLES in degrees in FIG. 2. | | | | | | |
| B1 degrees | 51 | 51 | 52 | 52 | 51 | 51 |
| B2 degrees | 92 | 92 | 84 | 84 | 83 | 83 |
| A1 degrees | 158 | 152 | 124 | 127 | 120 | 113 |
| A2 degrees | 85 | 92 | 109 | 109 | 120 | 110 |
| A3 degrees | 120 | 115 | 127 | 124 | 120 | 137 |
| C degrees | 1 | 1 | 6 | 6 | 7 | 7 |
| DISTANCES in mm. | | | | | | |
| "a" in FIG. 2 | 465 | 455 | 340 | 350 | 323 | 353 |
| "b" in FIG. 2 | 185 | 195 | 210 | 220 | 245 | 210 |
| "c" in FIG. 1 | 70 | 70 | | | | |
| "d" in FIG. 2 | 70 | 80 | 165 | 150 | 175 | 170 |
| "f" in FIG. 1 | 52 | 52 | | | | |
| "s" in FIG. 2 | | | 755 | 755 | 803 | 803 |

*Using the adjustable V lock mecahnism shown in FIGS. 4, 5 and 6.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A stand for locating a wheeled vehicle, the stand comprising
   front and rear locating structures for receiving a wheel of a wheeled vehicle and providing three pairs of cooperating locating surfaces for locating the wheel between the cooperating locating surfaces, in which the said three pairs of cooperating locating surfaces comprise a front lower pair of cooperating locating surfaces provided by the front locating structure, a rear lower pair of cooperating locating surfaces provided by the rear locating structure, and a front upper pair of cooperating locating surfaces provided by the front locating structure and arranged so as to be positioned above the lower pairs of cooperating locating surfaces when the stand is standing on a horizontal support surface in use,
   in which the front locating structure has an intermediate opening, positioned between the front lower pair of cooperating locating surfaces and the front upper pair of cooperating locating surfaces, which has a width greater than the distance between the cooperating locating surfaces of each front pair of cooperating locating surfaces, to allow the axle of a wheel to pass into the stand through the front locating structure, and
   in which the two lower pairs of cooperating locating surfaces are positioned asymmetrically relative to the upper pair of cooperating locating surfaces with the horizontal distance between the front lower pair of cooperating locating surfaces and the front upper pair of cooperating locating surfaces being greater than the horizontal distance between the rear lower pair of cooperating locating surfaces and the front upper pair of cooperating locating surfaces.

2. The stand according to claim 1, in which the front locating structure extends substantially in a single flat plane, and arranged such that, when the stand is standing on a horizontal support surface, the front locating structure is inclined towards the rear structure at an angle to the horizontal in the range of 20° to 50°.

3. The stand according to claim 1, in which the front locating structure extends substantially in a single flat plane, and arranged such that, when the stand is standing on a horizontal support surface, the angle between the front locating structure and the horizontal is less than 60 degrees.

4. The stand according to claim 1, in which the front locating structure extends substantially in a first single flat plane, and the rear locating structure extends substantially in a second single flat plane, and in which the front and rear locating structures are arranged to converge towards each other in an upward direction when the stand is standing on a horizontal support surface, and arranged such that, when the stand is standing on a horizontal support surface, the angle between the front locating structure and the horizontal is less than the angle between the rear locating structure and the horizontal.

5. The stand according to claim 4, arranged such that both the front and rear locating structures are arranged to be inclined to the vertical when the stand is standing on a horizontal support surface.

6. The stand according to claim 5, arranged such that, in use with the stand standing on horizontal ground, the rear locating structure is inclined away from the vertical towards the front locating structure at an angle to the vertical in the range 3 to 10°.

7. The stand according to claim 6, arranged such that, in use with the stand standing on horizontal ground, the rear locating structure is inclined towards the front structure at an angle to the vertical in the range of 5° to 7°.

8. The stand according to claim 1, in which the front locating structure is a substantially rigid, substantially flat planar structure with the said front pairs of cooperating locating surfaces being provided by edges of the front locating structure which locate the wheel in use substantially without deformation of the flat planar structure during entry and exit of the wheel.

9. A stand for locating a wheeled vehicle, the stand comprising
   front and rear locating structures for receiving a wheel of a wheeled vehicle and providing three pairs of cooperating locating surfaces for locating the wheel between the cooperating locating surfaces, in which the said three pairs of cooperating locating surfaces comprise a front lower pair of cooperating locating surfaces provided by the front locating structure, a rear lower pair of cooperating locating surfaces provided by the rear locating structure, and a front upper pair of cooperating locating surfaces provided by the front locating structure and arranged so as to be positioned above the lower pairs of cooperating locating surfaces when the stand is standing on a horizontal support surface in use,
   in which the front locating structure has an intermediate opening, positioned between the front lower pair of cooperating locating surfaces and the front upper pair of cooperating locating surfaces, which has a width greater than the distance between the cooperating locating surfaces of each front pair of cooperating locating surfaces, to allow the axle of a wheel to pass into the stand through the front locating structure,
   in which the two lower pairs of cooperating locating surfaces are positioned asymmetrically relative to the upper pair of cooperating locating surfaces with the horizontal distance between the front lower pair of cooperating locating surfaces and the front upper pair of cooperating locating surfaces being greater than the horizontal distance between the rear lower pair of cooperating locating surfaces and the front upper pair of cooperating locating surfaces,
   in which the front locating structure is a substantially rigid, substantially flat planar structure with the said front pairs of cooperating locating surfaces being provided by edges of the front locating structure which locate the wheel in use substantially without deformation of the flat planar structure during entry and exit of the wheel, and
   in which the cooperating locating surfaces of the front upper pair of cooperating locating surfaces are provided by a first locating component defining an upwardly extending opening, and by a second locating component defining a region in which the cooperating locating surfaces converge towards each other in an upward direction so as to be able to engage wheels of differing widths, the second locating component being movable towards and away from the lower end of the upwardly extending opening so as to be able to engage wheels of differing diameters.

10. The stand according to claim 1, arranged such that, when in use a wheel is engaged by the said three pairs of locating surfaces, the points of contact of the pairs of cooperating locating surfaces with the wheel are spaced apart such that the angle subtended at the wheel axle by the contact points of any two circumferentially adjacent pairs of cooperating locating surfaces is in the range 60° to 140°.

11. The stand according to claim 1, in which the stand is adapted to support a plurality of wheeled vehicles, and the front and rear locating structures have arrays of locating components positioned across the locating structures to receive an array of wheels.

12. The stand according to claim 11, in which the front locating structure and the rear locating structure are each formed of a respective flat sheet of material, the rear locating structure having its cooperating locating surfaces formed by a comb-like structure having projecting teeth which form between adjacent teeth the lower, rear, cooperating locating surfaces, and the front locating structure having its upper and lower cooperating locating surfaces formed by upper and lower comb-like structures having projecting teeth which form between adjacent teeth the cooperating locating surfaces, the front locating structure having a middle opening extending across the structure between its upper and lower locating surfaces, so as to allow the axles of wheels to pass through the front locating structure and having the periphery thereof located by the upper and lower pairs of cooperating locating surfaces.

13. The stand according to claim 1 when provided in a transport vehicle for transporting the wheeled vehicle.

14. A method of locating a wheeled vehicle comprising inserting a wheel of the wheeled vehicle into the stand according to claim 1 to engage the wheel with the said three pairs of cooperating locating surfaces of the stand.

15. A method of locating a wheeled vehicle, the method comprising:
  inserting a wheel of the wheeled vehicle into a stand which comprises a framework providing three pairs of cooperating locating surfaces for locating the wheel between the cooperating locating surfaces of each pair, and
  locating the wheel between the respective cooperating locating surfaces of the said three pairs of cooperating locating surfaces at positions spaced apart around the circumference of the wheel, by moving the wheel axle in a motion through a plane which includes the upper and a front one of the lower pairs of cooperating locating surfaces, in a direction towards the other, rear, lower pair of cooperating locating surfaces, the said plane being inclined towards the rear lower pair of cooperating surfaces at an angle to the horizontal in the range of 20° to 50°,
  in which the cooperating locating surfaces of a front upper pair of the cooperating locating surfaces of the framework are provided by a first locating component defining an upwardly extending opening, and by a second locating component defining a region in which the cooperating locating surfaces converge towards each other in an upward direction so as to be able to engage wheels of differing widths,
  the method including moving the second locating component towards and away from the lower end of the upwardly extending opening so as to be able to engage wheels of differing diameters.

16. A stand for locating a wheeled vehicle, the stand comprising
  front and rear locating structures for receiving a wheel of a wheeled vehicle and providing three pairs of cooperating locating surfaces for locating the wheel between the cooperating locating surfaces, in which the said three pairs of cooperating locating surfaces comprise a front lower pair of cooperating locating surfaces provided by the front locating structure, a rear lower pair of cooperating locating surfaces provided by the rear locating structure, and a front upper pair of cooperating locating surfaces provided by the front locating structure and arranged so as to be positioned above the lower pairs of cooperating locating surfaces when the stand is standing on a horizontal support surface in use,
  in which the cooperating locating surfaces of the front upper pair of cooperating locating surfaces are provided by a first locating component defining an upwardly extending opening and by a second locating component defining a region in which the cooperating locating surfaces converge towards each other in an upward direction so as to be able to engage wheels of differing widths, the second locating component being movable towards and away from the lower end of the upwardly extending opening so as to be able to engage wheels of differing diameters.

17. A stand for locating a wheeled vehicle, the stand comprising
  front and rear locating structures for receiving a wheel of a wheeled vehicle and providing three pairs of cooperating locating surfaces for locating the wheel between the cooperating locating surfaces, in which the said three pairs of cooperating locating surfaces comprise a front lower pair of cooperating locating surfaces provided by the front locating structure, a rear lower pair of cooperating locating surfaces provided by the rear locating structure, and a front upper pair of cooperating locating surfaces provided by the front locating structure and arranged so as to be positioned above the lower pairs of cooperating locating surfaces when the stand is standing on a horizontal support surface in use,
  in which the cooperating locating surfaces of the front upper pair of cooperating locating surfaces are provided by a first locating component defining an upwardly extending opening and by a second locating component defining a region in which the cooperating locating surfaces converge towards each other in an upward direction so as to be able to engage wheels of differing widths, the second locating component being movable towards and away from the lower end of the upwardly extending opening so as to be able to engage wheels of differing diameters,
  in which the upwardly extending opening is an elongate opening of substantially constant width and the second locating component is movable along the elongate opening towards and away from the lower end of the elongate opening.

18. The stand according to claim 16, in which the front locating structure extends substantially in a single flat plane, and arranged such that, when the stand is standing on a horizontal support surface, the angle between the front locating structure and the horizontal is less than 60 degrees.

19. The stand according to claim 16 in which the front locating structure is a substantially rigid, substantially flat planar structure with the said front pairs of cooperating locating surfaces being provided by edges of the structure which locate the wheel in use substantially without deformation of the flat planar structure during entry and exit of the wheel.

20. A method of locating a wheeled vehicle, the method comprising:
  inserting a wheel of the wheeled vehicle into a stand which comprises a framework providing three pairs of cooperating locating surfaces for locating the wheel between the cooperating locating surfaces of each pair, and locating the wheel between the respective cooperating locating surfaces of the said three pairs of cooperating locating surfaces at positions spaced apart around the circumference of the wheel, by moving the wheel axle in a motion through a plane which includes the upper and a front one of the lower pairs of cooperating locating surfaces, in a direction towards the other, rear, lower pair of cooperating locating surfaces, the said plane being inclined towards the rear lower pair of cooperating surfaces at an angle to the horizontal less than 60°, in which the cooperating locating surfaces of a front upper pair of the cooperating locating surfaces of the framework are provided by a first locating component defining an upwardly extending opening, and by a second locating component defining a region in which the cooperating locating surfaces converge towards each other in an upward direction so as to be able to engage wheels of differing widths, the method including moving the second locating component towards and away from the lower end of the upwardly extending opening so as to be able to engage wheels of differing diameters.

\* \* \* \* \*